United States Patent [19]

Blakeley

[11] 4,073,513
[45] Feb. 14, 1978

[54] PIPE BRANCH FITTING

[75] Inventor: James Blakeley, Thornhill, Canada

[73] Assignee: Blakeley Engineering Limited, Thornhill, Canada

[21] Appl. No.: 726,289

[22] Filed: Sept. 24, 1976

[51] Int. Cl.² ............................................. F16L 41/00
[52] U.S. Cl. .................................. 285/93; 285/158; 285/197; 285/355
[58] Field of Search .................. 285/197, 198, 199, 93, 285/158, 355; 137/318

[56] References Cited

U.S. PATENT DOCUMENTS

| 45,964 | 1/1865 | Ball | 285/197 |
|---|---|---|---|
| 1,178,234 | 4/1916 | Hayden | 285/199 |
| 2,618,511 | 11/1952 | Wahlin | 285/198 X |
| 2,973,976 | 3/1961 | Steinen | 285/197 |
| 3,489,441 | 1/1970 | Malcolm | 285/197 |
| 3,844,590 | 10/1974 | de la Fuente Burton | 285/197 |
| 3,999,785 | 12/1976 | Blakeley | 285/197 X |

FOREIGN PATENT DOCUMENTS 696,978  9/1953  United Kingdom ................. 285/197

Primary Examiner—Thomas F. Callaghan

[57] ABSTRACT

A pipe branch fitting has a cylindrical body freely slidable along the pipe to a point where a hole is pre-cut in the pipe. On one side, the cylinder carries a screw-threaded tubular insert on which the branch is to be connected. A gasket between the insert and the pipe gives a seal as the insert bears upon it as the insert is tightened up. The inner end of the insert has a stepped shoulder which abuts the periphery of the hole in the pipe and limits the compression applied to the gasket. The reduced diameter end of the insert locates itself in the hole and indicates if the fitting is misaligned with the hole.

6 Claims, 5 Drawing Figures

PIPE BRANCH FITTING

The present invention relates to pipe branch fittings intended for use where a branch is to be attached over a hole pre-cut in the wall of the main pipe.

This invention provides a fitting in the form of an embracement member which can be freely slid, in embracement around the pipe, from one end of the pipe to the point where the pipe has the pre-cut hole. The member has an opening in its side and there is a resilient sealing gasket at the inner side of the opening. A fitting part is provided in the opening and is adapted to connect with the branch. By a screw-threaded engagement between the fitting part and the embracement member, or by other means, the fitting part is displaceable inwardly to compress the gasket onto the wall of the pipe around the hole.

With this arrangement, as the insert part is displaced inwardly the gasket becomes compressed between the fitting part and the pipe wall as a result of a portion of the embracement member spaced circumferentially from and preferably opposite the opening being drawn into engagement with the pipe.

Known fittings have had split housings which are assembled around the pipe and are equipped with internal gaskets. These fittings have relied on bolts passed non-radially through the splittable parts to clamp them together and apply pressure to the internal gaskets. The bolts are received in open pockets formed in the housing parts. As a result these known fittings are of aesthetically unattractive irregular form, and tend to be bulky which restricts their use in tight spaces. Further, as a result of the exposure of the bolts and their tensile loading, the bolts are particularly susceptible to corrosion.

In contrast, with the arrangement above-described the fitting may be made of a compact pleasing appearance and the disadvantages of the bolts are avoided.

A further disadvantage arising from the said known kind of fitting is that unless a torque wrench or other special tool is used it is not always easy to obtain a degree of compression on the gasket such as is desirable for optimum sealing both initially and throughout the service life of the fitting.

In a further provision of the invention, a pipe branch fitting part, having a resilient gasket on an inner side which is to be placed against the main pipe, and having means whereby the fitting part can be urged towards the pipe, is provided with an inward-facing shoulder which forms an abutment as the fitting part moves toward the pipe and thus limits the compression applied to the gasket to a desired value. Thus by appropriate selection of the thickness of the gasket and the permitted extent of inward travel of the fitting part as determined by the shoulder, it is merely necessary to urge the fitting part inwardly to its fullest permissible extent to achieve a desired degree of compression.

This shoulder may be on an inner end of the fitting part so that it abuts on the periphery of the precut hole of the pipe when the part moves inwardly.

The invention will now be described in greater detail, by way of example only, with reference to the accompanying drawings, wherein.

Figure 1:
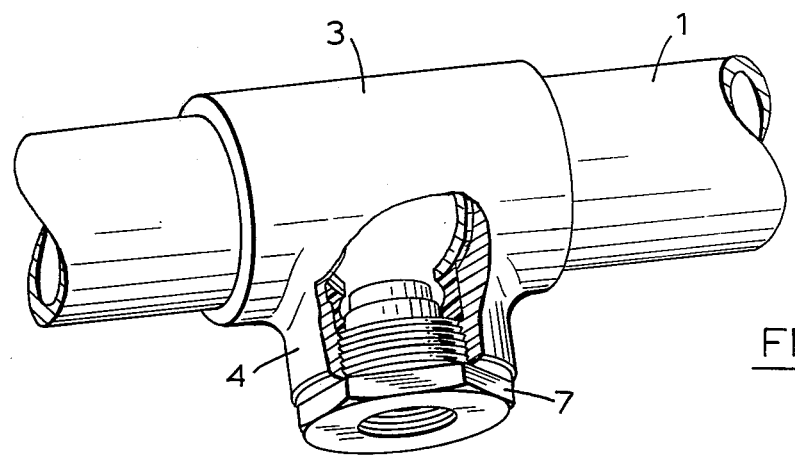
FIG. 1 shows in perspective a fitting applied on a main pipe with areas cut away to reveal interior detail.

Referring to the drawings wherein like reference numerals indicate like parts, a main pipe 1 has a pre-cut hole 2 and is provided with a pipe branch fitting in the form of a generally cylindrical embracement member 3 in embracing relationship around the pipe. The member 3 is sized internally so that it can be slid freely along the pipe 1 to a desired point where the branch is to be provided.

One side of the member carries a raised hollow boss 4 wherein is threaded a tubular fitting part 6 having an enlarged hexagonal end 7. The end 7 forms a nut to allow the part 6 to be readily tightened and slackened using a wrench.

A ring-form resilient sealing gasket 8 of rubber or synthetic elastomer is fitted within the root of the boss 4 and is pre-assembled together with the member 3 and part 4 before the whole is slid along the pipe from one end.

The part 6 has a threaded bore 9 at its outer end to receive the branch pipe or other branch member. Its inner end is of doubly-stepped configuration with an outer shoulder 11 bearing on the gasket, and an inner shoulder 12 from which the part 6 tapers slightly in a reduced width spigot end portion 13.

In use, after pre-cutting the hole 2 to a diameter appropriate to receive the spigot end portion 13, the fitting is slid from one end of the pipe to the position of the hole, and the part 6 is tightened up to compress the gasket into a tight seal between the part 6 and the pipe 1.

Figure 2:
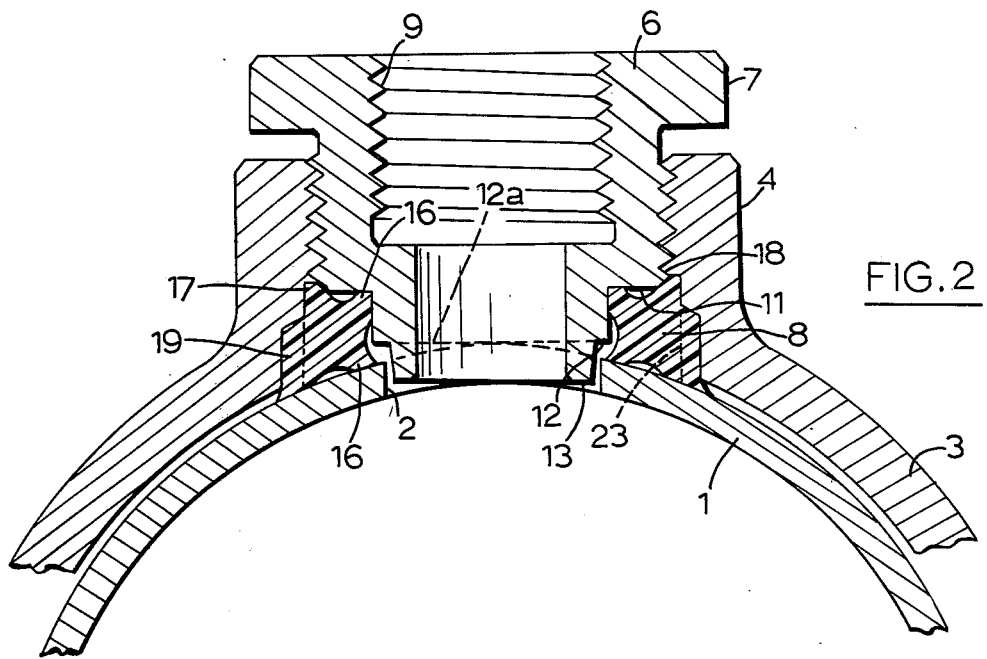
FIG. 2 is a vertical section through the fitting of FIG. 1 in the fully tightened state.
Figure 4:
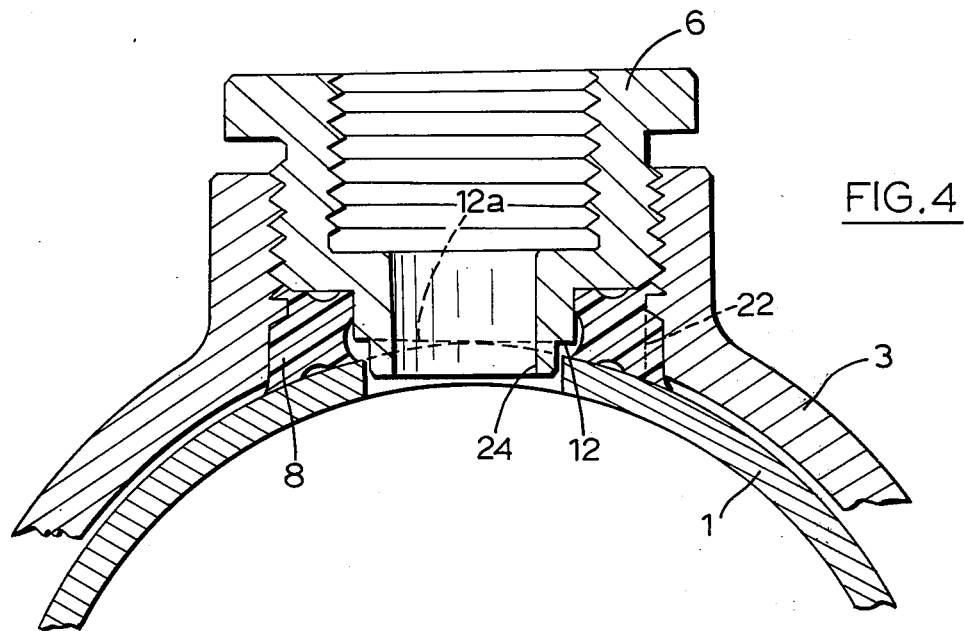
FIG. 4 shows an alternative form of fitting in the fully tightened state.

As the part 6 is displaced inwardly, the portion of the embracement member 3 opposite the boss will be drawn into tight engagement with the surface of the pipe 1, and at a pre-determined point the inner shoulder 12 will come into abutment with the periphery of the pipe wall about the hole 2, as indicated in broken lines in FIGS. 2 and 4, the line 12a showing the circumferential continuation of the shoulder 12. This abutment prevents further compression of the gasket 8 beyond a pre-determined limit. By appropriate selection of the thickness of the gasket and the maximum extent of inward movement of the part 6, the maximum compression of the gasket can be such as will give optimum sealing both initially and throughout the service life of the fitting. In the preferred form, a clearance exists between the boss 4 and the hexagonal end 7 at maximum tightening, and the end 7 does not serve as a stop.

The spigot end portion 13 locates itself in the hole 2 during the tightening operation and any degree of free rotation of the fitting about the pipe will immediately indicate if there is any misalignment of the fitting as a result of the spigot portion 13 lodging on the exterior of the pipe.

Further, it will be appreciated that the position of the end 7 relative to the end of the boss 4 when the part 6 is tightened up serves to indicate visually whether the spigot portion 13 is in the hole 2.

Figure 3:
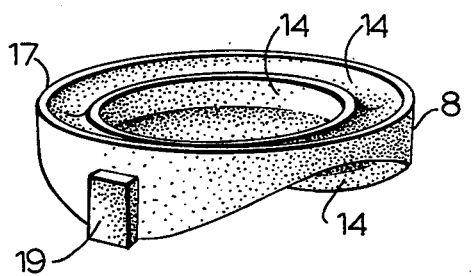
FIG. 3 shows the resilient gasket employed in the fitting of FIG. 1.

A preferred form for the gasket is shown in FIG. 3. The gasket has circumferentially continuous recesses 14 on its upper, lower and inner side surfaces which define between them outstanding pressure pads 16, allowing the gasket to more readily assume an appropriate deformed state under compression, and providing an effective seal. The upper side edge of the gasket includes a tapered profile 17 with which the leading thread 18 of the part 6 binds in the fully tightened state, the gasket being confined against lateral expansion by the surrounding walls of the boss 4. This binding action serves to reduce the risk of the part 6 becoming loosened under condition of vibration.

The gasket also has a pair of lateral keying projections 19 engaging in corresponding recesses in the root of the boss 4 and serving to maintain the specially-arced lower profile of the gasket in sealing alignment with the curved surface of the pipe.

Figure 5:
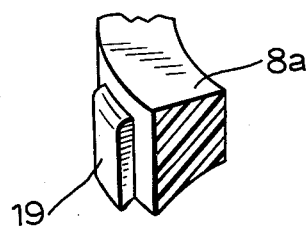
FIG. 5 shows an alternative form of gasket.

An alternative form of gasket 8a, having simply curved or flat surfaces, as shown in FIG. 5, may be more suitable for use where the fluid line pressures are not as great.

It will be noted that the lower surface of the gasket 8 or 8a is saddle-shaped so as to conform with the adjacent surface of the pipe 1. As will be seen from FIG. 2, the gasket 8 is confined between and is in substantially complete conformity with the shoulder surface 11 and spigot portion 13 of the fitting part 6, the inner surface of the boss 4, and the pipe 1.

FIG. 4 shows an alternative form of fitting which differs from that shown in FIG. 1 in that the bore through the boss 4, as indicated by the broken line 22, is of constant width, whereas in FIG. 2, the lower, non-threaded part of the bore, as indicated by the broken line 23 is made slightly wider than the upper, threaded part so as to permit the binding action referred to above between the gasket 8 and the leading thread 18 on the part 6. The form shown in FIG. 4 may be more convenient when problems of vibrational loosening of the fitting are not as marked, or where the diameter of the threaded bore 9 at the outer end of the part 6 is to be substantially larger than the diameter of the bore (indicated at 24 in FIG. 4) through the spigot end portion 13 of the part 6.

Instead of using a threaded engagement between the part 6 and the boss 4, the part 6 may be slidable vertically within the boss. For displacing the part 6 inwardly, a locking collar may be provided bearing on the top of the part 6, the collar being in threaded engagement on the outer surface of the boss 4.

It is not necessary that the embracement member 3 should extend continuously around the entire circumference of the pipe 1 in order to obtain the desired compression of the gasket between the pipe 1 and the part 6, and other forms of embracement member can be used having curved or angled arms which will embrace the pipe and react against the pipe surface when the part 4 is displaced inwardly. The continuously cylindrical shape 3 shown in the drawings is preferred as it is stronger and more stable.

The fittings as shown in the drawings may for example be applied in fire protection sprinkler piping systems, for connecting auxiliary pipes or sprinkler heads to a main pipe. They may be installed during in-shop pre-fabrication of piping systems but can also be used with particular advantage for additions to existing, installed piping systems, as the more modern installations have easily dismantled union type mechanical joints between the piping lengths permitting an end of the piping to be readily freed to allow the branch fitting to be slipped on.

It will be understood that the form of the invention herewith shown and described is a preferred example, and that various modifications can be carried out without departing from the spirit of the invention or the scope of the appended claims.

What I claim is:

1. In combination, a pipe, an embracement member having a cylindrical inner surface in embracement around the pipe at a point where the pipe has a pre-cut hole, an upstanding, hollow, internally threaded boss on one side of the member, a resilient sealing gasket at the inner side of the boss, a fitting part threaded in the opening having a planar annular surface bearing rotatably on the gasket and being formed at its inner end with a reduced width spigot portion positioned in the pre-cut hole and at its outer end with a nut extending above the boss so that the fitting part can be turned by a wrench to displace the fitting part inwardly to compress the gasket against the pipe, the spacing between the nut and the upper end of the boss serving to indicate visually the extent of inward movement of the fitting part, and an inward-facing shoulder on the spigot end portion for abutment on the outer surface of the pipe within said gasket whereby the compression applied to the gasket is restricted to a predetermined limit, the spigot end portion extending a short distance beyond said inward-facing shoulder, the gasket having at least one annular upper surface portion lying in a single transverse plane and a saddle-shaped lower surface conforming to the surface of the pipe around the pre-cut hole and being confined between and in substantially complete conformity with the adjacent surfaces of the fitting part, the embracement member and the pipe.

2. A fitting as claimed in claim 1 wherein the embracement member is a continuous cylindrical tube.

3. A fitting as claimed in claim 1 wherein the embracement has inner wall surfaces confining the gasket laterally and the gasket extends upwardly sufficiently to bind with the thread on the fitting part when the fitting part is tightened inwardly.

4. A fitting as claimed in claim 1 wherein the gasket has a circumferentially-extending depression in its upper surface.

5. The combination of claim 1 wherein the fitting part has a screw-threaded bore at its outer end for receiving the end of a branch pipe.

6. A pipe branch fitting as claimed in claim 1 in which the gasket has laterally-extending keying portions engaging with cooperating keying portions on the embracement member for preventing the gasket from rotating.

* * * * *